(12) United States Patent
Giannini et al.

(10) Patent No.: US 12,128,716 B2
(45) Date of Patent: Oct. 29, 2024

(54) TYRE MONITORING DEVICE COMPRISING AN ELECTRONIC UNIT AND TYRE COMPRISING SAID DEVICE

(71) Applicant: Pirelli Tyre S.p.A., Milan (IT)

(72) Inventors: Luca Giannini, Milan (IT); Cristiano Puppi, Milan (IT); Alfredo Balini, Milan (IT); Matteo Accorra', Milan (IT); Dario Rattazzi, Milan (IT); Giorgio Zuliani, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 255 days.

(21) Appl. No.: 16/771,809

(22) PCT Filed: Dec. 12, 2018

(86) PCT No.: PCT/IB2018/059924
§ 371 (c)(1),
(2) Date: Jun. 11, 2020

(87) PCT Pub. No.: WO2019/123118
PCT Pub. Date: Jun. 27, 2019

(65) Prior Publication Data
US 2021/0070117 A1 Mar. 11, 2021

(30) Foreign Application Priority Data
Dec. 18, 2017 (IT) .................. 102017000145407

(51) Int. Cl.
*B60C 23/04* (2006.01)
*B29D 30/00* (2006.01)
(Continued)

(52) U.S. Cl.
CPC ...... *B60C 23/0493* (2013.01); *G06K 19/0717* (2013.01); *G06K 19/07764* (2013.01); *B29D 2030/0077* (2013.01)

(58) Field of Classification Search
CPC .......... G06K 19/07764; G06K 19/0717; B60C 23/00; B60C 23/001; B60C 23/005; B60C 23/02; B60C 23/04; B60C 23/0493
(Continued)

(56) References Cited

U.S. PATENT DOCUMENTS 5,971,046 A 10/1999 Koch et al.
6,087,930 A 7/2000 Kulka et al.
(Continued)

FOREIGN PATENT DOCUMENTS

CN 101326065 A 12/2008
CN 102613774 A * 8/2012
(Continued)

OTHER PUBLICATIONS

Machine English-equivalent translation of DE 102007001279, European Patent Office, retrieved May 31, 2022 (Year: 2022).*
(Continued)

*Primary Examiner* — Suezu Ellis
(74) *Attorney, Agent, or Firm* — Finnegan, Henderson, Farabow, Garrett & Dunner, L.L.P.

(57) ABSTRACT

A tyre monitoring device with an electronic unit enclosed in an encapsulation material. The encapsulation material forms a single body with an upper portion and a lower portion. The upper portion encloses and protects the electronic unit and the lower portion has a base surface aimed at fixing said device to the inner surface of the tyre.

25 Claims, 3 Drawing Sheets

(51) Int. Cl.
*G06K 19/07* (2006.01)
*G06K 19/077* (2006.01)

(58) Field of Classification Search
USPC .................. 235/492, 439; 340/572.1, 572.8,
340/442–448; 152/152.1
See application file for complete search history.

(56) References Cited

U.S. PATENT DOCUMENTS

| | | | |
|---|---|---|---|
| 6,782,741 | B2 | 8/2004 | Imbert |
| 7,598,877 | B2 | 10/2009 | Lionetti |
| 2002/0174925 | A1* | 11/2002 | Wilson ................ B60C 23/0493 152/415 |
| 2005/0076982 | A1 | 4/2005 | Metcalf et al. |
| 2006/0220816 | A1 | 10/2006 | Scheungraber et al. |
| 2007/0146124 | A1* | 6/2007 | Shinmura ........... B60C 23/0493 340/447 |
| 2009/0084480 | A1 | 4/2009 | Adamson et al. |
| 2012/0267022 | A1 | 10/2012 | Tagashira |
| 2016/0185165 | A1* | 6/2016 | Mancosu ........... B60C 23/0493 73/146 |
| 2017/0001483 | A1 | 1/2017 | Sabatini et al. |
| 2017/0259630 | A1* | 9/2017 | Sakamoto ............ B60C 19/003 |

FOREIGN PATENT DOCUMENTS

| | | |
|---|---|---|
| DE | 202005005144 U1 | 7/2005 |
| DE | 102007001279 A1 | 7/2008 |
| DE | 102007005282 A1 | 8/2008 |
| DE | 102008063469 A1 | 1/2010 |
| EP | 1268225 B1 | 5/2004 |
| EP | 1501691 B1 | 11/2006 |
| WO | WO 99/41093 | 8/1999 |
| WO | WO2006/103706 A1 | 10/2006 |
| WO | WO 2007/000781 A1 | 1/2007 |
| WO | WO 2007/121768 A1 | 11/2007 |
| WO | WO 2010/043264 A1 | 4/2010 |
| WO | WO2013/098711 A1 | 7/2013 |
| WO | WO 2013/098712 A1 | 7/2013 |
| WO | WO 2015/019283 A1 | 2/2015 |
| WO | WO 2015/019288 A1 | 2/2015 |
| WO | WO-2019106893 A1 * | 6/2019 ............. B60C 19/00 |

OTHER PUBLICATIONS

Machine English-equivalent translation of DE 102008063469, European Patent Office, retrieved May 31, 2022 (Year: 2022).*
Machine English-equivalent translation of CN102613774, European Patent Office, retrieved Jun. 1, 2022 (Year: 2022).*
Machine translation of WO2019106893 from European Patent Office, retrieved Jun. 17, 2024 (Year: 2024).*
Notification of the First Office Action dated Jan. 26, 2022, from China National Intellectual Property Administration in counterpart Chinese Application No. 201880086511.6.
International Search Report form the European Patent Office in corresponding International Application No. PCT/IB2018/059924 mailed May 6, 2019.
Written Opinion of the International Searching Authority from the European Patent Office in corresponding International Application No. PCT/IB2018/059924 mailed May 6, 2019.

* cited by examiner

TYRE MONITORING DEVICE COMPRISING AN ELECTRONIC UNIT AND TYRE COMPRISING SAID DEVICE

This application is a national phase application under 35 U.S.C. § 371 based on International Application No. PCT/IB2018/059924, filed Dec. 12, 2018, and claims priority of Italian Patent Application No. 102017000145407, filed Dec. 18, 2017; the contents of each application is incorporated herein by reference.

FIELD OF THE INVENTION

The present invention relates to a tyre monitoring device comprising an electronic unit to be associated with a tyre. The present invention also relates to a tyre comprising a monitoring device. The present invention also relates to a method of production of a tyre monitoring device comprising an electronic unit.

STATE OF THE ART

For some types of tyres, especially those that require high level of performance, monitoring devices have been studied for a long time, which, when placed inside said tyres, will have the task of detecting characteristic quantities of the tyre, to allow a substantially real-time control of the operation and conditions of the tyre itself.

These monitoring devices will periodically communicate with the instrumentation available on board the vehicle, so that all relevant information can be provided to the driver and/or vehicle control systems, for example to activate or adjust at best alarm systems and/or vehicle dynamics control, braking, etc.

Tyre monitoring devices typically comprise an electronic unit and a securing device.

The electronic unit comprises at least one sensor (e.g. a temperature sensor, a pressure sensor, a sensor capable of measuring/identifying the deformations the tyre undergoes during rolling, such as an accelerometer, a strain gauge, etc.) and a transmission system, for sending the data detected by said at least one sensor to a receiving unit located on the vehicle.

In order to protect the electronic unit from the hostile conditions affecting the electronic unit when it is arranged inside the tyre, an encapsulation material (potting) can be used. The encapsulation material is poured into a mould covering the electronic unit, to cover the spaces around the elements that compose it. Once hardened, the encapsulation material forms a protective block with a high elasticity modulus around the elements of the electronic unit. In this way, the electronic unit is protected both from contaminating agents possibly present inside the tyre (for example powders, residues of chemical agents used in the production process, etc.), and from the stresses to which it can be subjected due to the tyre rolling (e.g. bending, shear, compression/traction stresses, impacts, etc.).

The securing device has the task of maintaining the electronic unit bound to the tyre. In particular, in order to be able to identify and measure the deformations undergone by the tyre and to estimate, from said deformations, some parameters (for example the length of the footprint area, the load acting on the tyre, the angular velocity, the friction between the tyre and the rolling surface, the tyre wear, etc.), it may be convenient to fasten one or more monitoring devices on the inner surface of the tyre, for example on the portion of inner surface opposite to the tread.

A basic problem of the securing devices concerns the fact that the tyre, especially at the entrance and exit of the footprint area, undergoes mechanical stresses which cause significant deformations to the securing device. On the other hand, the electronic unit is instead typically a substantially rigid body.

The fact that the (rigid) electronic unit must remain constrained to the inner surface of the tyre (subjected to deformation) is a very critical aspect for the securing device: the latter, although being fixed to the inner surface of the tyre, and being therefore subjected to the same stresses as the tyre, has the task of maintaining a reliable and long-lasting bond with a substantially non-deformable object, i.e. the housing of the electronic unit.

Patent applications WO2006/103706, WO2007/000781, WO2007/121768, WO2010/043264, WO2013/098711, WO2013/098712, WO2015/019283, WO2015/019288 in the name of the same Applicant describe some examples of securing devices. Other solutions are described in documents WO99/41093, U.S. Pat. No. 7,598,877, US2009/0084480, U.S. Pat. No. 6,782,741, EP1268225, EP1501691, U.S. Pat. No. 5,971,046, US 2006/0220816.

Many of these solutions provide arranging or enclosing the electronic unit (with its whole protective housing in rigid material) in a securing device made of elastomeric material, to be then fixed to the inner surface of the tyre through an adhesive, typically through a structural adhesive (for example based on cyanoacrylate materials).

SUMMARY OF THE INVENTION

The Applicant has faced the problem of permanently and lastingly binding an electronic unit to the inner surface of a tyre, in particular, in the crown region of said tyre.

The Applicant has verified that in cases where the electronic unit is fixed to a tyre for very high performances, the securing device and/or the inner surface of the tyre may be damaged during travel at very high speeds (for example above 250-270 km/h), due to:

a) the local increase of temperature at the interface between the electronic unit and the securing device, in particular in those cases in which the electronic unit is completely enclosed within the securing device; and/or b) the local failure of parts of the inner surface of the tyre and/or of the securing device placed in contact with each other through an adhesive, with consequent tearing of said surface/s; and/or c) adhesive failure.

The Applicant has therefore tackled the problem of providing a tyre monitoring device comprising an electronic unit suitable for being fixed to the inner surface of a tyre, being capable of withstanding the stresses imposed by the rolling of the tyre even at very high speeds (for example above 250-270 km/h).

The Applicant has found that this problem can be solved by making—with an encapsulation material—a single body with an upper portion and a lower portion, in which the upper portion encloses and protects the electronic unit and the lower portion has a base surface aimed at fixing said device to the inner surface of the tyre.

In a first aspect, the present invention relates to a tyre monitoring device, comprising an electronic unit at least partially enclosed in an encapsulation material.

The device comprises:

a lower portion having a base surface aimed at fixing said device to an inner surface portion of a tyre;

an upper portion arranged on the opposite side of said device with respect to said base surface, said upper portion enclosing said electronic unit.

At least part of said lower portion and at least part of said upper portion are formed in continuity by said encapsulation material.

Said upper portion projects on said lower portion an area smaller with respect to an area of said base surface.

In a second aspect, the present invention relates to a tyre comprising an inner surface and a monitoring device comprising an electronic unit enclosed in an encapsulation material as described above. The device is fixed through said base surface to said inner surface of the tyre by means of an adhesive layer.

In a third aspect, the present invention relates to a method of production of a tyre monitoring device comprising an electronic unit enclosed in an encapsulation material.

The device can be made by a mould comprising:
an upper portion;
a lower portion connected to said upper portion and extended in widening with respect to said upper portion up to an opening/closing end surface of said mould.

The upper portion of the mould projects on the lower portion an area smaller with respect to an area of said opening/closing end surface of said mould.

The method comprises:
arranging said electronic unit in said upper portion of said mould;
filling substantially up to said opening/closing end surface at least part of said mould with said encapsulation material or with precursors of said encapsulation material, to incorporate at least partially said electronic unit into said encapsulation material and to fill substantially all said lower portion of said mould;
hardening said encapsulation material to at least partially enclose said electronic unit in said encapsulation material.

The present invention, in one or more of the aforesaid aspects, may comprise one or more of the following preferred aspects.

Preferably the lower portion of the device comprises a plurality of reinforcing elements. Said reinforcing elements may comprise textile or metallic filaments or cords, for example made of one or more of the following textile materials: aramid, rayon, polyester, nylon, lyocell. The expression "one or more ( . . . ) textile materials" covers the case in which only a single material is used for all the textile filaments or cords used in the lower portion, or the case in which in the lower portion multiple materials are used in mixed filaments or cords (e.g. filaments or cords of a material alternating to filaments or cords of another material), or the case in which multiple materials in hybrid filaments or cords are used in the lower portion (e.g. cords comprising filaments of two different materials). The elongated reinforcing elements can also be made by, or can comprise, metallic filaments or cords (possibly metallic/textile hybrid cords), for example thin steel wires. The elongated reinforcing elements can preferably be arranged in the lower portion of the device with a density comprised between 30 cords/dm and 500 cords/dm.

Preferably, the reinforcing elements are associated with, or incorporated in, said encapsulation material. Alternatively or in combination, said reinforcing elements are incorporated in a layer of elastomeric material coupled (for example adhered and/or glued) to said encapsulation material. Regarding the elastomeric material, it is not particularly critical for the purposes of the present invention, and it can be prepared using materials typically used in tyre compounds. Typically, the elastomeric material comprises a rubber (e.g. a diene rubber, or a butyl rubber) reinforced with carbon black.

In preferred embodiments, the device is fixed to the inner surface of the tyre such that at least some of the elongated reinforcing elements are arranged substantially according to a circumferential direction of said tyre (i.e. within an angle of about ±25° with respect to the circumferential direction). This allows to counteract stresses transmitted to the monitoring device along circumferential direction, and in particular shear stresses, to which the upper portion of the device, containing the electronic unit, is subjected each time it passes at the entrance and/or at the exit of the footprint area.

In a preferred embodiment, the elongated reinforcing elements are arranged according to a square woven fabric, i.e. a fabric comprising a weft and a warp. Preferably, the monitoring device can be arranged in such a way that part of the elongated reinforcing elements is arranged substantially according to a circumferential direction of the tyre (i.e. within an angle of about ±25° with respect to the circumferential direction) and part of the elongated reinforcing elements is arranged substantially according to an axial direction of the tyre (i.e. within an angle of about ±25° with respect to the axial direction).

In a preferred embodiment, the elongated reinforcing elements occupy only a portion (e.g., a central portion or a ring-shaped portion) of the lower portion of the device. Preferably, the area of the portion occupied by the reinforcing elements may be intermediate between the area projected by the upper portion of the device and the area of the base surface.

In this configuration, the elongated reinforcing elements may form a transition layer with intermediate stiffness between the upper portion and the outermost part of the lower portion of the device.

In an alternative configuration, the elongated reinforcing elements are arranged in said lower portion of the device according to substantially radially extending directions starting from the geometric centre of the lower portion of the device.

Preferably, the upper portion of the device and/or of the inner cavity of the mould can have a substantially prismatic or cylindrical shape with a circular or oval base.

Optionally, the upper portion of the device can comprise a rigid body enclosing at least part of the electronic unit and at least part of the encapsulation material. For example, the rigid body can be made of plastic material, and/or by resins (e.g. epoxy or polyurethane resins), and/or of a sufficiently rigid elastomeric material.

Preferably, the lower portion of the device has a perimeter free from corners and/or portions with small curvature radii. Even more preferably, the lower portion of the device has a circular or oval shape. This allows reducing the onset of crack triggers in the base due to the concentration of stresses in corners or in any case in portions with small curvature radii. The onset of trigger points of localized detachments is also reduced.

In general, it may be convenient to provide the lower portion of the securing device with an elongated shape (for example oval, substantially rectangular with rounded corners, etc.). In this case, it may be convenient to fix the device to the inner surface of the tyre such that a greater dimension of the elongated shape base is arranged substantially according to a circumferential direction of said tyre (i.e. within an angle of about ±25° with respect to the circumferential direction).

Preferably, the area of the base surface of the device is equal to at least 130%, preferably equal to at least 200%, of the area projected onto the lower portion by the upper portion. Preferably, the area of the base surface of the device is at least equal to about 5 cm². Preferably, the area of the base surface of the device is less than about 80 cm², more preferably less than about 50 cm².

An encapsulation material particularly indicated for the purposes of the invention is a polyurethane material or a polyurea. Preferably, said polyurethane material may be a polyether-based polyurethane material.

Preferably, the encapsulation material has IRHD hardness at 100° C. greater than about 60, more preferably greater than or equal to about 70. Preferably, the encapsulation material has IRHD hardness at 100° C. less than about 90, more preferably less than or equal to about 85. Preferably, the encapsulation material has Shore A hardness at 23° C. greater than about 70, more preferably less than about 90. Preferably, the encapsulation material has 50% strain modulus at 100° C. of at least about 2 MPa, more preferably less than about 10 MPa. Preferably, the encapsulation material has tensile strength at 100° C. of at least about 4 MPa. Preferably, the encapsulation material has ultimate tensile strain at 100° C. of at least about 150%.

Preferably, the encapsulation material has a dynamic elastic modulus G' (measured at 70° C., at 3% of dynamic deformation and frequency 1 Hz) of at least about 4 MPa. Preferably, said elastic dynamic modulus G' is not higher than about 20 MPa.

In the outermost portion of the lower portion of the device, the encapsulation material may have a thickness of less than about 1.0 mm. Preferably said thickness can be greater than about 0.1 mm.

Globally, the lower portion may preferably have a maximum thickness of less than about 5 mm. In the portion below the upper portion, the lower portion may have a thickness preferably greater than about 0.5 mm.

Preferably, the encapsulation material of the lower portion is connected to the encapsulation material of the upper portion by one or more connecting portions having a radius of curvature of not less than 0.5 mm, preferably not greater than 10 mm.

Preferably, the upper portion of the device may have a minimum thickness of not less than about 5 mm, more preferably not greater than about 20 mm. Overall, the device may have a maximum thickness (or height) not greater than about 30 mm, preferably not greater than about 25 mm.

Preferably, the base surface of the device comprises an adhesive layer suitable for gluing to the inner surface portion of the tyre. Said adhesive may preferably be a pressure sensitive adhesive.

The use of a pressure sensitive adhesive (PSA) allows fixing the device to the inner surface of a tyre with an extremely simplified procedure. The PSA allows in fact the gluing to the inner surface of the tyre by the action of a pressure carried out on the base of the device that does not require particularly long times or particular attention in the application of the pressure itself, or it does not require particular environmental conditions during gluing. At the same time, the increased surface with respect to that of the module containing or suitable to contain the electronic unit allows obtaining a solid and effective gluing against the stresses imposed by the rolling of the tyre.

In preferred embodiments, the pressure sensitive adhesive (PSA) may be an acrylic adhesive, a silicone adhesive, a butyl adhesive, a natural rubber-based adhesive, a block copolymer-based adhesive. More specifically, the pressure sensitive adhesive (PSA) should be selected such that it is compatible with the tyre inner surface compound (i.e. of the liner or innerliner). This feature does not seem to be particularly critical per se, since substantially all PSAs have a formulation based on elastomeric polymers. Moreover, the PSA should be able to ensure strong adhesion at room temperature (i.e. about 25° C.) and to not degrade at high temperatures (i.e. up to about 100-160° C.), and/or to ensure high resistance to shear stresses, in particular to cyclic shear stresses. The Applicant has verified that acrylic adhesives in particular can be adapted to these purposes. For example PSA supported double-sided adhesives may be used (consisting of multiple layers, including two layers of PSA on two outer faces and a central layer made of plastic and/or elastomeric and/or expanded material), transfer adhesives (i.e. layers or films consisting of bulk acrylic adhesive) and double-sided adhesive acrylic foams (i.e. layers or films consisting of a bulk acrylic adhesive, at least expanded in the central part of the layer or film itself). The person skilled in the art can however choose the most convenient PSA taking into account the specifications described above.

Alternatively or in combination with the use of a pressure sensitive adhesive, it can be provided to realize the adhesive layer by a structural adhesive. Said structural adhesive can, for example, be an adhesive based on cyanoacrylate, a polyurethane adhesive, an epoxy adhesive, an acrylic adhesive. These adhesives, by polymerizing between the surfaces to be joined, and possibly by forming a lattice at the interface of the surfaces bonded to each other, are able to withstand large stresses, greater than the ultimate tensile strength of the material of which the surfaces are made of. In other words, when the securing device is glued to the inner surface of the tyre by a structural adhesive, and a stress is applied tending to separate the securing device from the inner surface of the tyre after the gluing, the adhesive resists to the stress until the tearing of one of the glued surfaces, without having instead a tearing of the polymerized layer formed by the structural adhesive. The formation of such a resistant interface layer is very advantageous for the purpose of fixing a monitoring device on the inner surface of a tyre, since this layer acts in practice as a real welding, capable of effectively resisting the stresses transmitted to the tyre due to rolling.

In particularly preferred embodiments, the base surface of the device can be formed by a double-sided adhesive film adhering to the encapsulation material, which bears said adhesive layer. Said double-sided adhesive film may preferably be arranged to close the mould at the opening/closing surface of the mould itself, before hardening the encapsulation material.

The device is preferably fixed to a crown portion of the inner surface of the tyre, i.e. to a portion opposite to the tread of said tyre.

In preferred embodiments, it may be convenient to provide the portion of the inner surface of the tyre, designated for fixing the securing device according to an aspect of the invention, in such a way that it is as clean as possible of substances which endanger the adhesion of the device itself, such as, for example, dust, dirt and/or residues of release agents used during tyre vulcanization. This can be achieved, for example, by cleaning with detergents, and/or solvents, and/or by mechanical action, and/or by laser polishing. In another embodiment, a protective film can be arranged on the green tyre upstream the vulcanization, at the portion of inner surface intended for gluing the securing device. The protective film maintains the portion of the inner surface of the tyre substantially free of pollution from release agents (or in any case from dirty or unwanted substances coming from the vulcanization process), and is then removed downstream of the vulcanization process, before gluing of the securing device. This film can be made of a material resistant to the operating conditions of temperature and pressure typical of the vulcanization process, such as, for example, nylon or polyester.

It is specified that the terms "lower" and "upper" used in the present description and in the claims are not to be interpreted in a limiting sense, and are used for merely descriptive purposes to distinguish different portions of the objects to which they refer.

It is furthermore specified that the static and dynamic parameters used in the present description and claims are to be considered as measured according to the following standards/methods, on specimens aged for 24 h at 70° C. and then returned to room temperature before their use:

IRHD: International Standard ISO 48, "Rubber, vulcanized or thermoplastic—Determination of hardness between 10 IRHD and 100 IRHD", Fifth Edition, 2010 Sep. 15;

Shore A: International Standard ISO 7619-1, "Rubber, vulcanized or thermoplastic—Determination of indentation hardness—Part 1: Durometer method (Shore hardness)", Second Edition, 2010 Oct. 1;

50% tensile strain, ultimate tensile strain, ultimate tensile strength: International Standard ISO 37, "Rubber, vulcanized or thermoplastic—Determination of tensile stress-strain properties", Fifth Edition, 2011 Dec. 15;

Elastic dynamic module G': measurement obtained with the "Rheometric Ares" instrument, marketed by TA Instruments, on a specimen in the form of a rectangular strip of material of dimensions 24 mm×12 mm×2 mm, twisted with a deformation width of 3% (from +3% to −3%), over a temperature range from −40° C. to +170° C., with a ramp of 2° C./min.

For the purposes of the present invention, by "circumferential direction" of the tyre it is meant a direction oriented according to the rolling direction of the tyre itself.

For the purposes of the present invention, by "axial direction" of the tyre it is meant a direction parallel to the axis of rotation of the tyre.

BRIEF DESCRIPTION OF THE DRAWINGS

Further features and advantages of the present invention will become apparent from the following detailed description of some of its exemplary embodiments, provided purely by way of non-limiting examples. The description will refer to the attached figures, in which.

DETAILED DESCRIPTION OF EXAMPLES OF THE INVENTION

Figure 1:
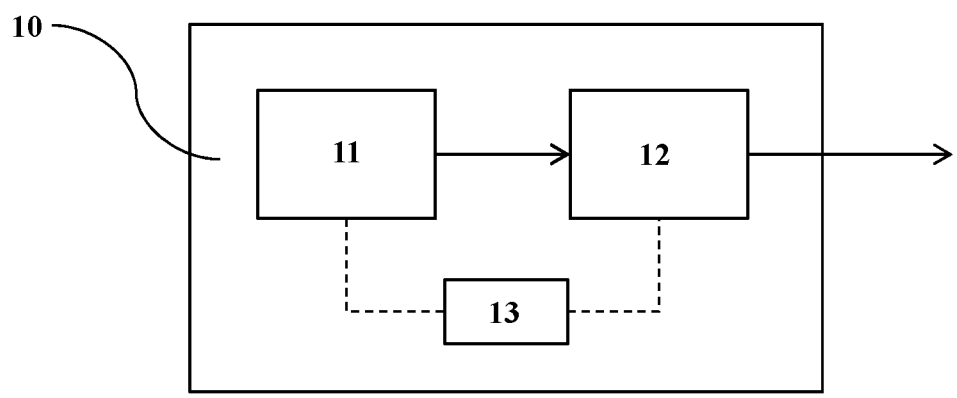
FIG. 1 schematically shows an electronic unit comprising at least one sensor for monitoring tyres.

With reference to the accompanying FIGS. 1-4, reference number 1 globally indicates a tyre monitoring device for vehicle wheels.

The monitoring device 1 comprises first of all an electronic unit 10, adapted to detect at least a characteristic quantity of a tyre and to transmit at least a corresponding parameter representative of said measured quantity. For this purpose, the electronic unit 10 can be provided with at least one sensor 11 suitable for detecting said at least a characteristic quantity, operatively associated with a processing/transmission system 12 of said at least a parameter. The electronic unit 10 further comprises an electric supply device 13 for supplying the components of the unit 10 itself, for example a battery.

The at least one sensor 11 may be, for example, a temperature sensor, and/or a pressure sensor, and/or a sensor capable of measuring the deformations undergone by the tyre during rolling, such as a strain gauge, or an accelerometer, an optical sensor capable of detecting displacements, a magnetoresistive sensor, an inertial sensor, a gyroscope, etc.

The processing/transmission system 12, operatively connected to said at least one sensor 11, provides for acquiring and processing the data detected by the latter. Downstream of the processing, the processing/transmission system 12 provides for the transmission outside the tyre of the parameter or of the parameters characteristic of the quantity to be monitored.

The processing/transmission system 12 preferably comprises a microprocessor, an antenna and other circuitry necessary to perform a treatment and/or analysis of the signals coming from the at least one sensor 11, to make them suitable for data transmission from the monitoring device 1 to a receiver external to the tyre, for example placed on board a vehicle.

In one embodiment, the data made available by the sensor 11 can at least be partially processed directly by the system 12, advantageously provided with a suitable microprocessor or integrated circuit (for example of the ASIC type—Application Specific Integrated Circuit).

The processing/transmission system 12 thus allows communication with an external receiver or device, for example with a smartphone or with the instrumentation available on board the vehicle. The communication can be carried out, for example, periodically, so that all the relevant information can be provided to the driver and/or to a vehicle control system, and/or in order to activate or adjust at best alarm and/or of vehicle dynamics control, braking etc.

This communication can be either monodirectional (from the electronic unit 10 to the external receiver), or bidirectional.

The monitoring device 1 comprises a lower portion 30 having a base surface 32 aimed at fixing the device 1 to the inner surface of a tyre. The electronic unit 1 is enclosed in an upper portion 40 of the monitoring device 1, arranged at the opposite side with respect to the base surface 32. Preferably, the upper portion 40 of the monitoring device 1 has a substantially prismatic shape (typically with rounded corners) or cylindrical shape with a circular or oval base. In the preferred embodiment shown in the figures, the upper portion 40 of the monitoring device 1 has substantially cylindrical shape. In order to distinguish the upper portion 40 from the lower portion 30, the surface of the electronic unit 10 which is more proximal to the lower portion 30 can be taken as reference. In the embodiment shown in the figures, this surface is represented by the lower surface of the battery 13.

In the upper portion 40 the electronic unit 10 is enclosed in an encapsulation (or potting) material 20. An encapsulation material particularly indicated for the purposes of the invention is a polyurethane or a polyurea. Preferably, said polyurethane material can be an elastomeric polyurethane material, preferably based on polyether. Preferably, the encapsulation material has IRHD hardness at 100° C. greater than about 60, more preferably greater than or equal to about 70. Preferably, the encapsulation material has IRHD hardness at 100° C. less than about 90, more preferably less than or equal to about 85. Preferably, the encapsulation material has Shore A hardness at 23° C. greater than 70, more preferably less than 90. Preferably, the encapsulation material has 50% strain module at 100° C. of at least about 2 MPa, more preferably less than about 10 MPa.

Preferably, the encapsulation material has an ultimate tensile strength at 100° C. of at least 4 MPa, and/or an ultimate tensile strain at 100° C. of at least 150%.

Preferably, the encapsulation material has a dynamic elastic modulus G' (measured at 70° C., at 3% of dynamic deformation and frequency 1 Hz) of at least about 4 MPa. Preferably, said elastic dynamic modulus G' is not higher than about 20 MPa.

Examples of encapsulation materials suitable for the purposes of the present invention can be obtained from the ELASTURAN® 6065/114/A55 elastomeric polyurethane family, produced by BASF.

More particularly, the encapsulation material 20 (represented by point-stroke pattern in FIG. 4) surrounds at least part of the battery 13, of the connecting circuits and of the integrated circuit of the electronic unit 10. A containment body 41 may enclose, in the upper portion 40, at least part of the electronic unit 10 and the encapsulation material 20. For example, the containment body 41 can be made of plastic material, and/or by resins (e.g. epoxy or polyurethane resins), and/or made of a sufficiently rigid elastomeric material. The containment body 41 can completely enclose the electronic unit 10, to make it inaccessible or irreplaceable.

Conveniently, it may be provided that some portions 42 of the cavity inside the containment body 41 arranged above the electronic unit 10 are not reached by the encapsulation material 20, so as to leave an air gap which can be put into fluid communication with the outside through a hole applied in the containment body 41. This is particularly convenient if the monitoring device 1 comprises a pressure and temperature sensor. Moreover, the presence of one or more gaps 42 can reduce the occurrence of interference and/or absorption phenomena of the electromagnetic radiations emitted by the processing/transmission device of the electronic unit 10 due to the encapsulation material 20. A sealing ring 41a projecting internally from the containment body 41 prevents the encapsulation material 20 from being disposed in the cavity portions 42 intended to form the gap. In a preferred embodiment, the integrated circuit of the electronic unit 10 is glued to the containment body 41 at least at the sealing ring 41a. A further projection 41b acts as a support for the electronic unit 10 during the application of the encapsulation material 20, and keeps the position of the electronic unit stable inside the inner cavity of the containment body 41. In an embodiment not shown in the figures, the upper portion 40 is formed by the encapsulation material 20 only, without the presence of the containment body 41.

Globally, the upper portion 40 of the monitoring device 1 can have a minimum thickness (or overall height) of not less than about 5 mm, so as to have sufficient space for the electronic unit 10, for the air gap portions 42 and for a sufficient amount of encapsulation material 20.

In order to maintain a compactness of the device 1 and/or not to excessively lift up its center of gravity, a thickness (or overall height) of not more than about 20 mm may be provided.

According to an important aspect of the invention, the lower portion 30 of the monitoring device 1 is made by the encapsulation material 20. In other words, the upper portion 40 and the lower portion 30 of the monitoring device 1 are formed in continuity by the encapsulation material 20. More particularly, the encapsulation material 20 widens from the upper portion 40 to form the thin lower portion 30 which terminates in the base surface 32. As it can be seen in FIGS. 3 and 4, the upper portion 40 projects onto the lower portion 30 an area being smaller with respect to the base surface area 32. In this way a stable securing system of the electronic unit 10 to a tyre can be realized. This securing can take place, as it will be better detailed below, by an adhesive arranged on the base surface 32. Preferably, the area of the base surface 32 is at least 130%, more preferably at least 200%, even more preferably at least equal to 300% of the area projected by the upper portion 40 onto the lower portion 30.

Globally, the lower portion 30 may have a maximum thickness of less than about 5 mm. The lower portion 30 may be formed by the encapsulation material and by one or more reinforcing layers of elastomeric material, and/or by one or more adhesive layers. In preferred embodiments, the lower portion 30 is made solely of said encapsulation material 20 and of one or more adhesive layers. In the outermost portion of the lower portion 30 (i.e. in the portion not affected by the projection of the upper portion 40), the encapsulation material may have a thickness of less than about 1.0 mm. Preferably said thickness can be greater than about 0.1 mm. In the portion below the upper portion 40, the lower portion 30 may preferably have a thickness greater than about 0.5 mm.

A connecting portion 21 allows achieving the transition between the upper portion 40 and the lower portion 30. The connecting portion 21 is preferably made by suitable curvature radii, to reduce the probability of occurrence of breaking and/or detachment trigger points of the upper portion 40 from the lower portion 30. Preferably, curvature radii of not less than about 0.5 mm can be used for the connecting portion 21. In order to limit the overall thickness (or overall height) of the monitoring device 1, curvature radii of no more than about 10 mm can be provided. In an embodiment not shown in the figures, connecting portions of different thickness and/or curvature radii can be provided to achieve the transition between the upper portion 40 and the lower portion 30.

Preferably, the lower portion 30 has a perimeter devoid of corners and/or portions with small curvature radii. In the embodiment shown in the figures, the lower portion 30 has a circular shape. Alternatively, the lower portion 30 may have elongated shape, for example oval or substantially rectangular with rounded corners, etc. In a preferred embodiment, not shown in the figures, the lower portion 30 comprises a plurality of incisions made on the surface opposite the base surface 32. These incisions are preferably arranged radially departing from the geometric centre of the monitoring device 1. Advantageously, the incisions allow to locally reducing the stiffness of the lower portion 30, so as to form hinge areas which can locally absorb strains and stresses transferred from the inner surface of the tyre during rolling. In an alternative embodiment not shown in the figures, the lower portion 30 can be formed at least partially by sectors and/or lobes separated from one another and arranged side by side in a substantially circular or oval arrangement.

Figure 2:
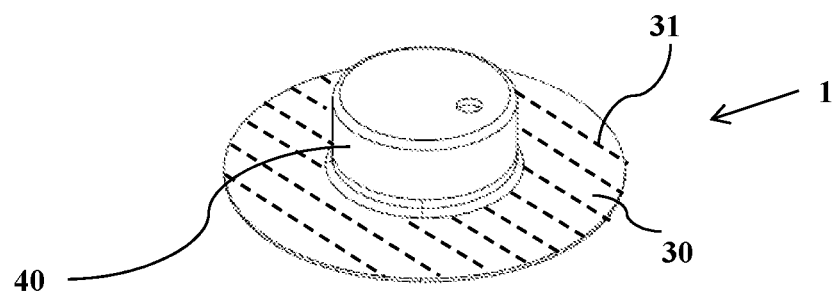
FIG. 2 shows a tyre monitoring device according to an embodiment of the invention.
Figure 3:
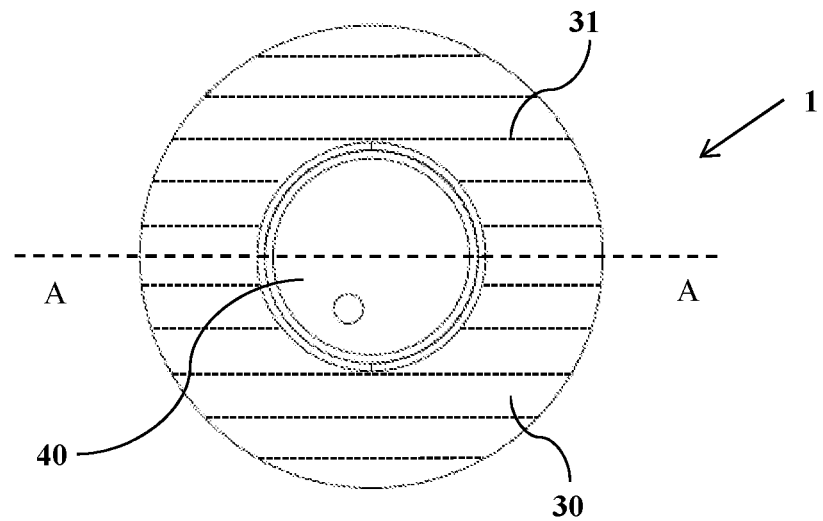
FIG. 3 is a plan view of the monitoring device of FIG. 2.
Figure 4:
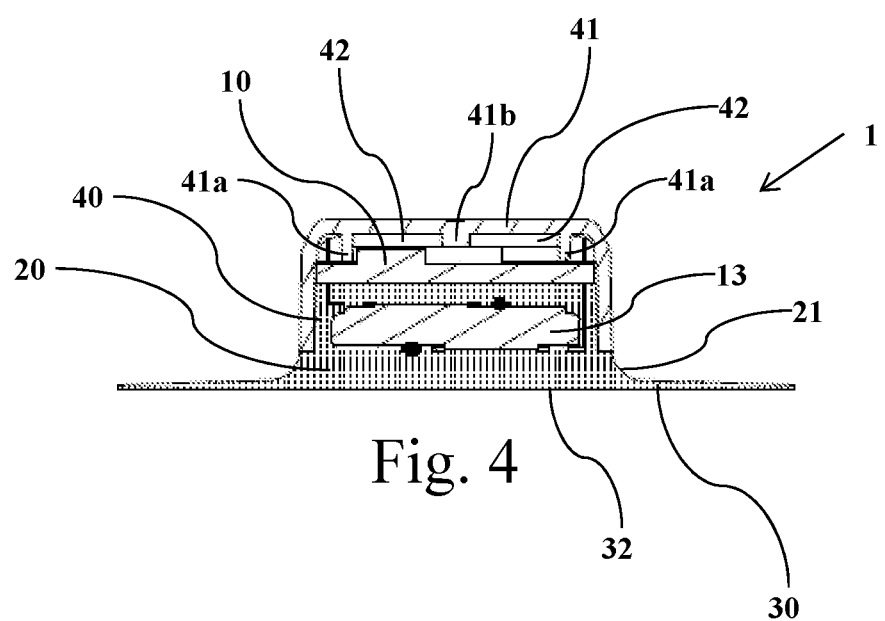
FIG. 4 schematically shows a section of the monitoring device of FIG. 2-3 along the section A-A.

In the preferred embodiment shown schematically in FIGS. 2-3, the lower portion 30 comprises a plurality of elongated reinforcing elements 31, for example filaments or textile cords, made of aramid, and/or rayon, and/or polyester, and/or nylon, and/or lyocell. Alternatively, the elongated reinforcing elements 31 can also be made of, or comprise, metallic filaments or cords, for example made of steel. The elongated reinforcing elements 31 can be incorporated within the encapsulation material 20. Alternatively, they may be arranged in an additional layer (e.g., an elastomeric material layer) coupled to the encapsulation material 20. Preferably, the elongated reinforcing elements 31 are arranged substantially parallel to each other. In an embodiment not shown in the figures, the elongated reinforcing elements can be arranged in radially extending directions starting from the geometric center of the lower portion 30. In a further embodiment not shown in the figures, the elongated reinforcing elements may be arranged according to a square woven fabric, i.e. forming a fabric comprising a weft and a warp.

In the embodiment shown in FIGS. 2-3, the elongated reinforcing elements 31 extend substantially over the whole lower portion 30. In an alternative embodiment, the area occupied by the elongated reinforcing elements may extend only for part of the lower portion 30, preferably up to occupy an intermediate area between the area projected by the upper portion 40 on the lower portion 30 and the area of the base surface 32. In a further alternative embodiment not shown in the figures, the lower portion does not comprise elongated reinforcing elements.

In order to glue the monitoring device 1 onto the inner surface of the tyre, the base surface 32 of the lower portion 30 is coated with an adhesive. Preferably the adhesive is a pressure sensitive adhesive (PSA). In preferred embodiments, the PSA may be an acrylic adhesive, a silicone adhesive, a butyl adhesive, a natural rubber-based adhesive, a block copolymer-based adhesive. Supported double-sided PSA can be used (consisting of multiple layers, including two PSA layers on two external faces and a central layer of plastic and/or elastomeric and/or expanded material), such as the 3M™ product 93430 and the 3M™ product 4026; transfer adhesives (i.e. layers or films consisting of a bulk acrylic adhesive), such as the Nitto 5025 product; double-sided adhesive acrylic foams (i.e. layers or films consisting of a bulk acrylic adhesive, expanded at least in the central part of the layer or of the film itself), such as for example the 3M™ product 5952.

Preferably, the PSA is arranged as a layer over the whole base surface 32 of the lower portion 30. Advantageously, the PSA can be a double-sided adhesive film adhered to the encapsulation material, to form the base surface 32 of the lower portion 30. In order to protect the PSA a removable film can then be arranged, such as a polyester, polyethylene or polypropylene, or paper film, coated with a non-stick layer. Upon gluing of the monitoring device 1 onto the inner surface of the tyre, said protective film may be removed so as to expose the PSA layer to the inner surface of the tyre in the chosen gluing portion. The gluing is then carried out by a simple pressure action carried out on the monitoring device 1 against the inner surface of the tyre, so as to cause the PSA to act and form the connecting layer. Alternatively or in combination with the use of a PSA, it is possible to provide the adhesive layer through a structural adhesive. Such a structural adhesive can, for example, be an adhesive based on cyanoacrylate, a polyurethane adhesive, an epoxy adhesive, an acrylic adhesive.

The tyre monitoring device 1 can be produced by a mould having a cavity substantially conformed and shaped in a manner equivalent to the outermost shape of the device itself. The mould therefore comprises an upper portion and a lower portion. The lower portion is connected to the upper portion and extends in widening with respect to the upper portion, up to an opening/closing end surface of the mould. The upper portion of the mould projects on the lower portion an area smaller with respect to an area of the opening/closing end surface of the mould. The opening/closing end surface may be part of the mould itself, or may be realized by one of the layers which—in the formed device 1—are arranged in the lower portion, at the base surface 32. For example, the opening/closing end surface of the mould can be formed by a double-sided adhesive film. In another embodiment, the opening/closing end surface of the mould may be made of a layer of elastomeric material incorporating the aforementioned elongated reinforcing elements. In another embodiment, the opening/closing end surface of the mould may be formed by a layer of non-stick material with respect to the encapsulation material 20, such as a polyolefin, preferably polypropylene or polyethylene. In this way, the base surface 32 of the lower portion 30 of the resulting device can be substantially free of contaminating materials, so as to facilitate its gluing.

Preferably, the mould is made, at least in the part of its inner surface destined to contact the encapsulation material 20, of a non-stick material with respect to the encapsulation material 20 itself. For example, such a non-stick material may comprise a polyolefin, preferably polypropylene or polyethylene. Alternatively, it is possible to coat the inner surface of the mould with an anti-adhesive material non-polluting with respect to the encapsulation material 20.

In order to produce the monitoring device 1, the electronic unit 10 is arranged in the upper portion of the mould. If the containment body 41 is provided, the electronic unit 10 is arranged at least partially inside the containment body 41 itself, which is preliminarily housed against the inner surface of the upper portion of the mould. Alternatively, the electronic unit is arranged directly inside the mould. Preferably, the electronic unit 10 is arranged in a way that its portion carrying the integrated circuits and the sensors is at the opposite side with respect to the lower portion. The battery 13 of the electronic unit 10 is instead arranged towards the lower portion of the mould.

Optionally, at least one of the surfaces of the battery 13 can be treated with a primer to promote adhesion of the encapsulation material 20 to the battery itself. Having thus arranged the electronic unit 10 inside the upper portion of the mould, the latter is filled substantially up to its opening/closing end surface with the encapsulation material 20, typically in the liquid or semi-liquid state, until substantially all the lower portion of the mould is filled. Alternatively, the mould can be filled by precursors of the encapsulation material 20, which, when mixed together, form the encapsulation material 20 by chemical reaction inside the mould itself. In both cases, the electronic unit 10 is at least partially incorporated into the encapsulation material 20. If the containment body 41 is present, the seal ring 41a prevents the encapsulation material 20 from passing into the upper portion of the mould, so as to leave the gap portions 42.

Finally, the mould is closed and subjected to a thermal cycle to cure and/or stabilize the encapsulation material 20 around the electronic unit 10, and to form the lower portion 30 of the monitoring device 1 in structural continuity with the upper portion 40. The thermal cycle can be carried out by bringing or keeping the mould at a temperature at least equal to the ambient temperature for a period of at least 2 minutes, preferably at a temperature not greater than 150° C. for a time not exceeding 10 hours.

For example, the thermal cycle may comprise a first phase at a temperature of 50-70° C. for 3-20 minutes. Downstream of the first phase, the device can be extracted from the mould without being damaged (when the encapsulation material is sufficiently rigid/consistent). It can then be subjected (not necessarily immediately after extraction from the mould) to a further thermal cycle at 70-100° C. for 12-36 hours to stabilize the mechanical properties of the encapsulation material.

Figure 5:
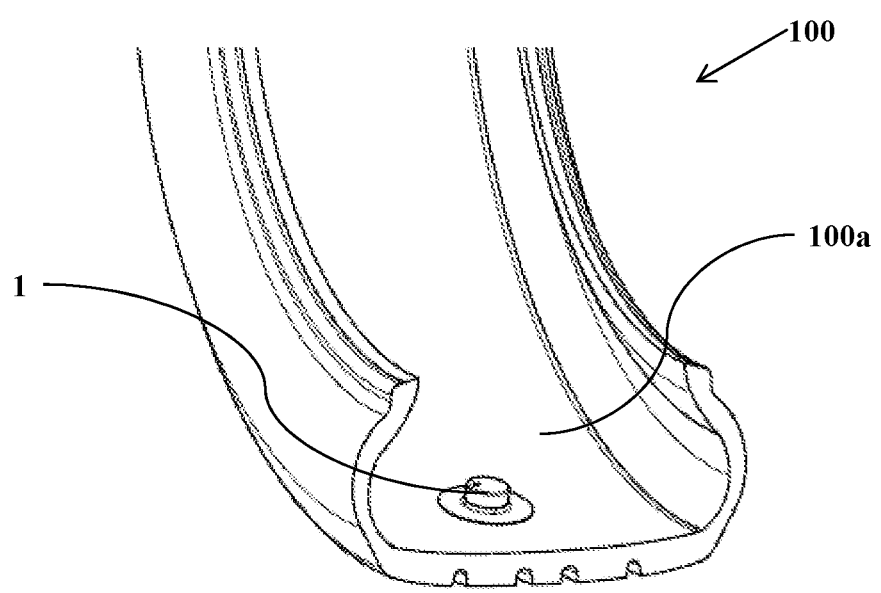
FIG. 5 shows a tyre with a monitoring device glued on its inner surface.

FIG. 5 schematically shows the monitoring device 1 fixed to the radially inner surface 100a of a tyre 100. The monitoring device 1 is fixed to the inner surface 100a of the tyre 100 by gluing the lower portion of the monitoring device to the inner surface 100a of the tyre 100. Gluing is carried out through the adhesive layer arranged on the base surface of the monitoring device 1.

In the embodiment shown in the figure, the monitoring device 1 is fixed to a portion of the inner surface 100a opposite to the tread of the tyre 100. More specifically, the monitoring device 1 is fixed onto an inner surface portion located at, or across, the equatorial plane of the tyre.

If the base surface of the monitoring device 1 has elongated shape, it may be convenient to fix the monitoring device to the inner surface 100a of the tyre 100 such that the greater dimension of the base surface is arranged substantially according to a circumferential direction of the tyre 100.

If the lower portion of the monitoring device 1 comprises elongated reinforcing elements, it may be convenient to fix the monitoring device 1 to the inner surface 100a of the tyre 100 such that said elongated reinforcing elements are arranged substantially according to a circumferential direction of the tyre 100.

If the upper portion of the monitoring device 1 has elongated shape, it may be convenient to fix the monitoring device 1 to the inner surface 100a of the tyre 100 such that the greater dimension of the upper portion extends substantially according to an axial direction of the tyre 100.

In preferred embodiments, before fixing the monitoring device 1, the portion of inner surface 100a of the tyre 100 intended for gluing is cleaned of substances which may jeopardize the adhesion of the device, such as for example dust, dirt and/or residues of release agents used during tyre vulcanization. This can be achieved, for example, by cleaning with detergents, and/or solvents, and/or by mechanical action, and/or by laser polishing. In another embodiment, a protective film, for example a nylon or polyester film, can be prepared on the green tyre before vulcanization, at the inner surface portion of the tyre which is intended for the gluing of the monitoring device. The protective film maintains the portion of the inner surface of the tyre substantially free of pollution from release agents (or in any case from dirty or unwanted substances) used in the vulcanization process, remaining adherent to the finished tyre at the end of the vulcanization. Before gluing the monitoring device 1, the film is removed to expose a portion of the inner surface 100a of the tyre 100 clean for the gluing of the monitoring device 1. It may also be convenient to use a primer on the inner surface 100a of the tyre 100, for example to promote the adhesion of high-cohesion PSA, particularly suitable for use up to high temperatures. An example of primer that can be used is 3M™ Primer 94.

The base surface of the monitoring device 1 can be also conveniently cleaned, for example with solvents and/or mechanical action, before gluing the device 1 to the inner surface 100a of the tyre 100.

Even for the base surface of the monitoring device 1 it may also be convenient to use a primer, for example the same primer used on the inner surface 100a of the tyre 100.

In use, during rolling of the tyre 100, the electronic unit 10 contained in the monitoring device 1 provides to detect and transmit the envisaged data. The monitoring device 1 is subjected to very relevant stresses, in particular in the radial and circumferential directions, when it passes through the entrance and the exit of the footprint area. The stresses caused by the rolling of the tyre 100 are transferred to the inner surface 100a and, hence, to the monitoring device 1. The lower portion 30 having a base surface 32 of significant area allows distributing the stresses. Moreover, without being bound to any interpretative theory, the Applicant believes that the structural continuity between the lower portion 30 and the upper portion 40 of the monitoring device realized by the encapsulation material 20 allows dissipating the energy transmitted by the stresses. In this way, the formation of cracks and/or detachment portions in the monitoring device is effectively counteracted, so as to maintain a firm constraint of the monitoring device 1 itself to the inner surface 100a of the tyre 100.

EXAMPLES

The precursors formulated to obtain the Elasturan® 6065/114/A55 polyurethane encapsulation material with a Shore A hardness of 23° C. of 87 were purchased from BASF. These precursors are: i) isocyanate component based on diisocyanate of 4,4'-metilendiphenylene; ii) a polyol component also comprising butanediol as a chain extender.

The two precursors were kept at 50° C. for 24 h and then transferred to the respective tanks of a machine suitable for mixing the two components in a 100/100 weight ratio and pouring the mixture into a thermostated mould.

The apparatus comprised, in addition to the two tanks for the components of the encapsulation material, the pumps for precisely dosing the components themselves, a mixing head for mixing them properly, a nozzle for pouring the mixture into moulds placed on a thermostated rotating table and a solvent tank to wash the mixing head and the nozzle downstream of the head itself.

Each tank was thermostated at 55° C. and the content kept under constant stirring for 24 h in conditions of reduced pressure (0.25-0.75 bar) to degassing it, by recirculating it in the respective circuit which connects each tank to the mixing head, to thermostatically control also these parts of the machine. Each component was continuously filtered on the return circuit.

In order to verify the static and dynamic elastic properties of the resulting encapsulation material, as well as to evaluate the appropriate maturation time to wait before extraction of the device from the mould without damaging it, samples of pure encapsulation material were prepared by pouring the mixture of the two components in a mould thermostated at 55° C. of substantially prismatic shape with a rectangular base, closed with a lid covered with a sheet of polypropylene, obtaining plates of about 100×50×2 mm. Under the conditions described above, there was obtained a material extractable after 3.5 minutes and such that, after maturation for 20 minutes at 100° C., the durometer Shore A gave a reading of 78 on the 2 mm of hot material, reading which was used to preliminarily assess the conformity of the obtained material to the desired properties.

The material, after ageing of 24 h at 70° C., also had the following properties: IRHD at 100° C.=80; ultimate tensile strength at 100° C.=7.3 MPa; ultimate tensile strain at 100° C.=402%; 50% tensile strength at 100° C.=3.35 MPa; G' (70° C., 3%, 1 Hz)=8.1 MPa.

In an assembly line a series of identical integrated circuit samples including temperature and pressure sensors has been prepared.

Each integrated circuit has been welded to a battery, so as to position the battery on a plane substantially parallel to that of the integrated circuit itself.

The integrated circuit has been designed to not have through holes, after the battery welding operation, to prevent the passage of encapsulation material.

Each electronic unit thus made has been placed in a substantially cylindrical containment body made of nylon filled with glass fiber (injection moulded) and has been glued to it through an epoxy adhesive ring arranged both along a sealing ring and around a hole located at the pressure measuring element. The coupling of each electronic unit with the containment body has been realized so that the battery was substantially coaxial to the containment body.

The devices were prepared by cleaning the battery of each assembly with alcohol and then by applying with a brush to the battery an alcohol solution of a primer (LORD Chemosil X 1960-22) to facilitate the attachment of the polyurethane to the metal. Each assembly was then kept in a stove at 75° C. for 30-60 minutes and then placed in a mould thermostated at 55° C., mounted on a rotating table.

The mould was mounted to have the part with smaller section, corresponding to the containment body, at the bottom, so that the assembly had the battery facing upwards.

Each mould was then brought under the nozzle of the dosing machine and the mixture of the two precursor components of the encapsulation material was dispensed inside it, so as to fill the part above the integrated circuit of the electronic unit. An excess of encapsulation material was dispensed, so that when the mould was closed, while the material was still liquid, the excess escaped, thus ensuring the complete filling of the mould itself. An acrylic double-sided PSA 3M™ 93430 adhesive tape disk with a 70 mm diameter was applied to the mould closing surface (by a double-sided adhesive), so that a part of the adhesive came into contact with the encapsulation material, while the opposite adhesive face, adherent to the lid of the mould, was protected by a protective film (silicone paper). After 3.5 minutes from the casting, the devices were extracted from the mould, maintained at 55° C. After elimination of the excess of adhesive and encapsulation material, the finished devices were thus obtained, in which the diameter of the upper portion was 25 mm and the diameter of the lower portion was 55 mm; the thickness of the encapsulation material was 0.5 mm at the outer edge of the lower portion and 1.5 mm at the geometric center. The connection radius between the top and bottom was 2.5 mm.

The devices extracted from the mould were then treated for 24 hours at 75° C. in a stove under a stream of nitrogen, to reduce the onset of possible oxidation phenomena.

Four of these devices were fixed inside a PZERO™ 305/30R20 (103Y) tyre produced by the Applicant, in which four respective portions of nylon film had been applied before vulcanization to keep clean the underlying inner surface areas of the crown portion of the tyre intended for fixing the devices themselves: the nylon film portions have been removed one by one, and each device has been placed at the protected inner surface area, by removing the adhesive protective film immediately before application and then by pressing the device on the inner surface of the tyre, with an applied pressure higher than about 0.5 kg/cm², to make the PSA adhering. The application of the device was carried out in order to avoid air trapping as much as possible.

After 24 hours from the application of the devices to the tyre, the same was mounted on a rim and subjected to a standard indoor high-speed test ECE 30 Y, approved for the Y marking, which provides a series of revolutions on road wheel at gradually increasing speed. After a step at 300 km/h the tyre was removed and the integrity of the devices was checked; the tyre was then mounted again and brought, according to the methodology, up to 350 km/h. At the end of the test the tyre was removed and it was checked that the devices were still functioning and substantially adhered.

Likewise, four devices were fixed respectively inside two PZERO™ 305/30R20 (103Y) tyres and two PZERO™ 245/35R20 (91Y) tyres produced by the Applicant. The tyres were mounted on a Porsche 911 and the vehicle was then subjected to a series of hard handling laps on racetrack, with speeds up to 260 km/h: at the end of the test, with the tyres heavily worn, it was checked that the devices were still functioning and substantially adhered.

The invention claimed is:

1. A tyre monitoring device, comprising an electronic unit at least partially enclosed in an encapsulation material, the device comprising:
    a lower portion having a base surface for fixing the device to an inner surface portion of the tyre; and
    an upper portion arranged on an opposite side of the device with respect to the base surface, and the upper portion encloses at least part of the electronic unit;
    wherein:
    the encapsulation material is comprised in both the lower portion and the upper portion;
    the encapsulation material of the lower portion and the upper portion is in continuity to form a single body;
    the lower portion has an outermost portion, and the encapsulation material of the lower portion is located at least at the base surface and the outermost portion;
    the upper portion has an area smaller than an area of the base surface of the lower portion;
    the area of the base surface of the lower portion is equal to at least 300% of the area of the upper portion; and
    the encapsulation material directly contacts at least a portion of a battery of the electronic unit.

2. The device according to claim 1, wherein the lower portion comprises a plurality of reinforcing elements.

3. The device according to claim 2, wherein the reinforcing elements comprise textile filaments, textile cords, metallic filaments, or metallic cords.

4. The device according to claim 3, wherein the textile filaments or cords are made of one or more of the following textile materials chosen from: aramid, rayon, polyester, nylon, lycocell, and combinations thereof.

5. The device according to claim 2, wherein the reinforcing elements are arranged in the lower portion with a density comprised between 30 cords/dm and 500 cords/dm.

6. The device according to claim 2, wherein the reinforcing elements are further associated with or incorporated in the encapsulation material.

7. The device according to claim 6, wherein the reinforcing elements are incorporated in a layer of elastomeric material coupled to the encapsulation material.

8. The device according to claim 1, wherein the upper portion has a substantially prismatic or cylindrical shape with a circular or oval base.

9. The device according to claim 1, wherein the lower portion has a circular or oval shape.

10. The device according to claim 1, wherein the upper portion comprises a rigid body enclosing at least part of the electronic unit and at least part of the encapsulation material.

11. The device according to claim 1, wherein the encapsulation material is a polyurethane material or a polyurea.

12. The device according to claim 11, wherein the encapsulation material is a polyether-based polyurethane material.

13. The device according to claim 12, wherein the polyether-based polyurethane material has International Rubber Hardness Degrees (IRHD) hardness at 100° C. greater than 60.

14. The device according to claim 13, wherein the polyether-based polyurethane material has IRHD hardness at 100° C. less than 90.

15. The device according to claim 1, wherein the outermost portion of the lower portion has a thickness of less than 1.0 mm.

16. The device according to claim 15, wherein the outermost portion of the lower portion has a thickness greater than 0.1 mm.

17. The device according to claim 1, wherein the encapsulation material of the lower portion is connected to the encapsulation material of the upper portion through one or more connecting portions having a radius of curvature of not less than 0.5 mm.

18. The device according to claim 17, wherein the radius of curvature is not greater than 10 mm.

19. The device according to claim 1, wherein the lower portion has a thickness of less than 5 mm and greater than 0.1 mm.

20. The device according to claim 1, wherein the upper portion has a minimum thickness of not less than 5 mm.

21. The device according to claim 20, wherein the minimum thickness is not greater than 20 mm.

22. The device according to claim 1, wherein the base surface comprises an adhesive layer suitable for gluing to the inner surface portion of the tyre.

23. The device according to claim 22, wherein the adhesive is a pressure sensitive adhesive, a structural adhesive, or a combination thereof.

24. A tyre comprising an inner surface and a monitoring device, the monitoring device comprising an electronic unit encapsulated in an encapsulation material, the device comprising:
    a lower portion having a base surface for fixing the device to an inner surface portion of the tyre; and
    an upper portion arranged on an opposite side of the device with respect to the base surface, and the upper portion encloses at least part of the electronic unit;
    wherein:
    the encapsulation material is comprised in both the lower portion and the upper portion;
    the encapsulation material of the lower portion and the upper portion is in continuity to form a single body;
    the lower portion has an outermost portion, and the encapsulation material of the lower portion is located at least at the base surface and the outermost portion;
    the upper portion has an area smaller than an area of the base surface of the lower portion;
    the area of the base surface of the lower portion is equal to at least 300% of the area of the upper portion; and
    the encapsulation material directly contacts at least a portion of a battery of the electronic unit.

25. The tyre according to claim 24, wherein the device is fixed to a portion of the inner surface opposite to a tread of the tyre.

* * * * *